US012020723B2

(12) United States Patent
Majors (10) Patent No.: US 12,020,723 B2
(45) Date of Patent: Jun. 25, 2024

(54) EMBEDDED PLUG-IN PRESENTATION AND CONTROL OF TIME-BASED MEDIA DOCUMENTS

(71) Applicant: Avid Technology, Inc., Burlington, MA (US)

(72) Inventor: Robert E. Majors, Bellingham, WA (US)

(73) Assignee: AVID TECHNOLOGY, INC., Burlington, MA (US)

( * ) Notice: Subject to any disclaimer, the term of this patent is extended or adjusted under 35 U.S.C. 154(b) by 0 days.

(21) Appl. No.: 17/096,120

(22) Filed: Nov. 12, 2020

(65) Prior Publication Data

US 2022/0148615 A1 May 12, 2022

Related U.S. Application Data

(60) Provisional application No. 63/015,713, filed on Apr. 27, 2020.

(51) Int. Cl.
*G10L 21/12* (2013.01)
*G06F 3/0482* (2013.01)
(Continued)

(52) U.S. Cl.
CPC ............ *G10L 21/12* (2013.01); *G06F 3/0482* (2013.01); *G06F 9/44526* (2013.01);
(Continued)

(58) Field of Classification Search
CPC ... G10L 21/12; G06F 3/0482; G06F 9/44526; G11B 27/02; G11B 27/031;
(Continued)

(56) References Cited

U.S. PATENT DOCUMENTS 5,874,952 A * 2/1999 Morgan .................. G11B 27/34
715/764
6,167,404 A * 12/2000 Morcos ............... G06F 9/44526
707/999.102
(Continued)

FOREIGN PATENT DOCUMENTS

DE 102008017080 A1 * 10/2009 ......... A61B 17/3401
EP 3086315 A1 * 10/2016

OTHER PUBLICATIONS

L. Gagnon, C. Chapdelaine, D. Byrns, S. Foucher, M. Héritier and V. Gupta, "A computer-vision-assisted system for Videodescription scripting," 2010 IEEE Computer Society Conference on Computer Vision and Pattern Recognition—Workshops, 2010, pp. 41-48, doi: 10.1109/CVPRW.2010.5543575. (Year: 2010).*
(Continued)

*Primary Examiner* — Kieu D Vu
*Assistant Examiner* — Blaine T Basom
(74) *Attorney, Agent, or Firm* — Oliver Strimpel (57) ABSTRACT

A software plug-in module that interfaces to a media editing host application generates and embeds information about a media composition being edited directly within portions of the user interface generated by the host application. The information may include a custom representation of media data of a time-based element of the media composition that replaces, augments, or overlays a timeline representation of the element generated by the host application. Media editing functionality provided by the plug-in may be accessed by an operator based on viewing or interacting with the custom representation. Results of analysis of the media composition by the plug-in may be displayed within the host-generated timeline and used by an operator as a basis for performing edit operations with standard host tools or with plug-in generated tools. Plug-ins may embed their interfaces within
(Continued)

user interfaces of host digital audio workstations, non-linear video editing systems, and music notation applications.

24 Claims, 9 Drawing Sheets

(51) Int. Cl.
*G06F 9/445* (2018.01)
*G11B 27/02* (2006.01)
*G11B 27/031* (2006.01)

(52) U.S. Cl.
CPC ............ *G11B 27/02* (2013.01); *G11B 27/031* (2013.01); *G10H 2220/101* (2013.01)

(58) Field of Classification Search
CPC ... G11B 27/022; G11B 27/024; G11B 27/026; G11B 27/028; G11B 27/029; G11B 27/032; G11B 27/034; G11B 27/036; G11B 27/038; G06V 20/49; G10H 2220/091; G10H 2220/096; G10H 2220/101; G10H 2220/106; G10H 2220/111; G10H 2220/116; G10H 2220/121; G10H 2220/126; G10H 2220/131; G10H 2240/325
See application file for complete search history.

(56) References Cited

U.S. PATENT DOCUMENTS

| | | | |
|---|---|---|---|
| 7,640,069 B1* | 12/2009 | Johnston | H04R 5/02 381/98 |
| 2006/0085439 A1* | 4/2006 | Sawyer | G06F 9/44505 |
| 2011/0154290 A1* | 6/2011 | Kelly | G06F 9/44505 717/110 |
| 2014/0304597 A1* | 10/2014 | Einstein | H04N 21/8547 715/716 |
| 2016/0300596 A1* | 10/2016 | Ransdell | G11B 27/34 |
| 2018/0247002 A1* | 8/2018 | Mendez | G06F 30/20 |

OTHER PUBLICATIONS

Audacity Development Manual, Spectral Selection and Editing, Apr. 3, 2020, 9 pages.

Avid Technology, Inc, Pro Tools Reference Guide Mar. 2020, Chapter 44, Clip Gain and Clip Effects, pp. 959-972, Mar. 30, 2020.

Avid Technology, Inc., Pro Tools Reference Guide Mar. 2020, Chapter 45, Elastic Audio, pp. 983-1005, Mar. 30, 2020.

Celemony Software GmbH, On-line Manual, Melodyne Editor, Melodyne in Presonus Sudio One Using ARA, Jan. 14, 2015, pp. 72-78.

* cited by examiner

EMBEDDED PLUG-IN PRESENTATION AND CONTROL OF TIME-BASED MEDIA DOCUMENTS

CROSS REFERENCE TO RELATED APPLICATION

This application claims right of priority to and the benefit under 35 U.S.C. § 119(e) of U.S. provisional patent application Ser. No. 63/015,713, filed Apr. 27, 2020.

BACKGROUND

Audio composition software such as a digital audio workstation (DAW) typically presents a document organized into a series of tracks, or lanes, with each track containing sequences of data such as audio clips, MIDI data, volume control data, or other kinds of performance or control data. The data contained in each track is presented to the user in a form which assists a user to understand its nature and properties. For example, audio data is often represented as a waveform to give some indication of the overall sonic characteristics and particularly the amplitude of the audio signal, or as a spectrogram, which provides a more detailed view into the signal's spectral content. DAWs generally represent regions of audio data arranged in a sequence of tracks represented as horizontal or vertical lanes. Data for each track is arranged in a linear timeline within the corresponding lane in which spatial position is used to represent the playback time of the data. Individual media elements, such as clips or MIDI notes, are typically represented as separate objects on a track. The user interaction model usually involves document concepts such as region and object selection and a selection point or cursor, as well as tools to interact with the document in terms of these concepts.

Figure 1:
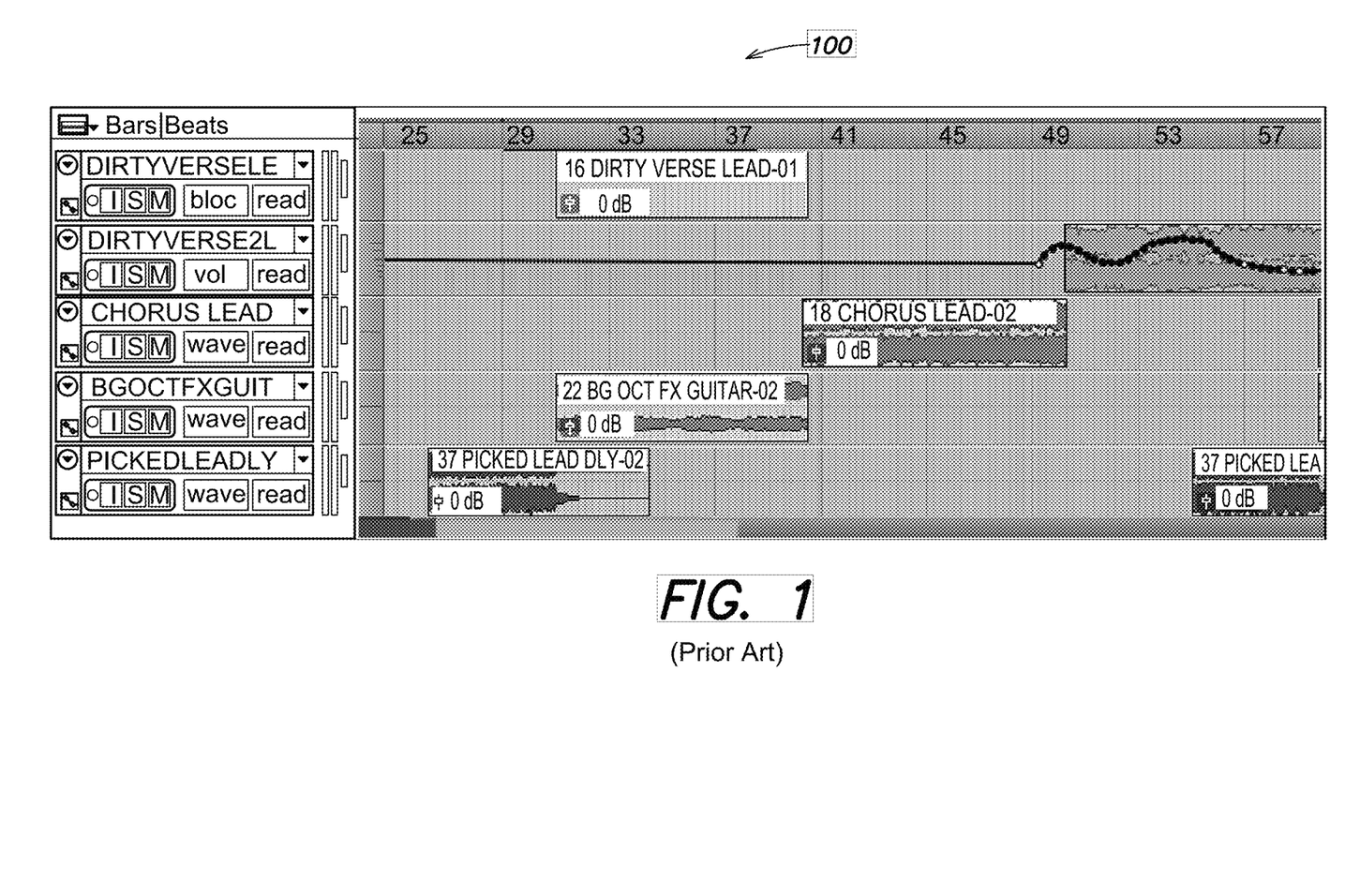
FIG. 1 is a diagrammatic representation of a portion of a user interface of a prior art digital audio workstation application.

FIG. 1 illustrates timeline window 100 of a DAW which represents audio data as a waveform showing the data's amplitude over time. The example also shows multiple tracks, each of which contain elements organized into one or more lanes. In addition, the example shows an overlay representation of control data on one track, with a black line representing the control value at different points on the timeline overlaid by the DAW onto the presentation of the track's audio waveform presentation. Other kinds of metadata and control presentations are overlaid by the DAW onto the audio data presentation including a name in the top left corner of each audio clip element. On the left-hand side of the example there are a series of control panes representing different aspects of the track's behavior or state such as audio routing settings. In this example, the control panes are fixed to the track display. The timeline display on the right shows a window of a timeline which can be scrolled back and forth to present data associated with different points in time of a media composition. The track property and settings shown on the left are presented regardless of which part of the timeline is currently shown. The DAW may provide the ability for the user to select which settings are shown from among a menu of possibly many different kinds of track settings and property panes.

Plug-in software modules are used to extend certain aspects of the processing capabilities of the host software (e.g., a DAW). In order to work with the host, the plug-ins adhere to a processing application programming interface (API), such as the audio and MIDI data processing APIs VST (Steinberg), Audio Units (Apple®), AAX (Avid®), ARA (Celemony), and Rack Extensions (Propellerhead). An example of a video processing API for a non-linear video editing host application is AVX (Avid).

Figure 2:
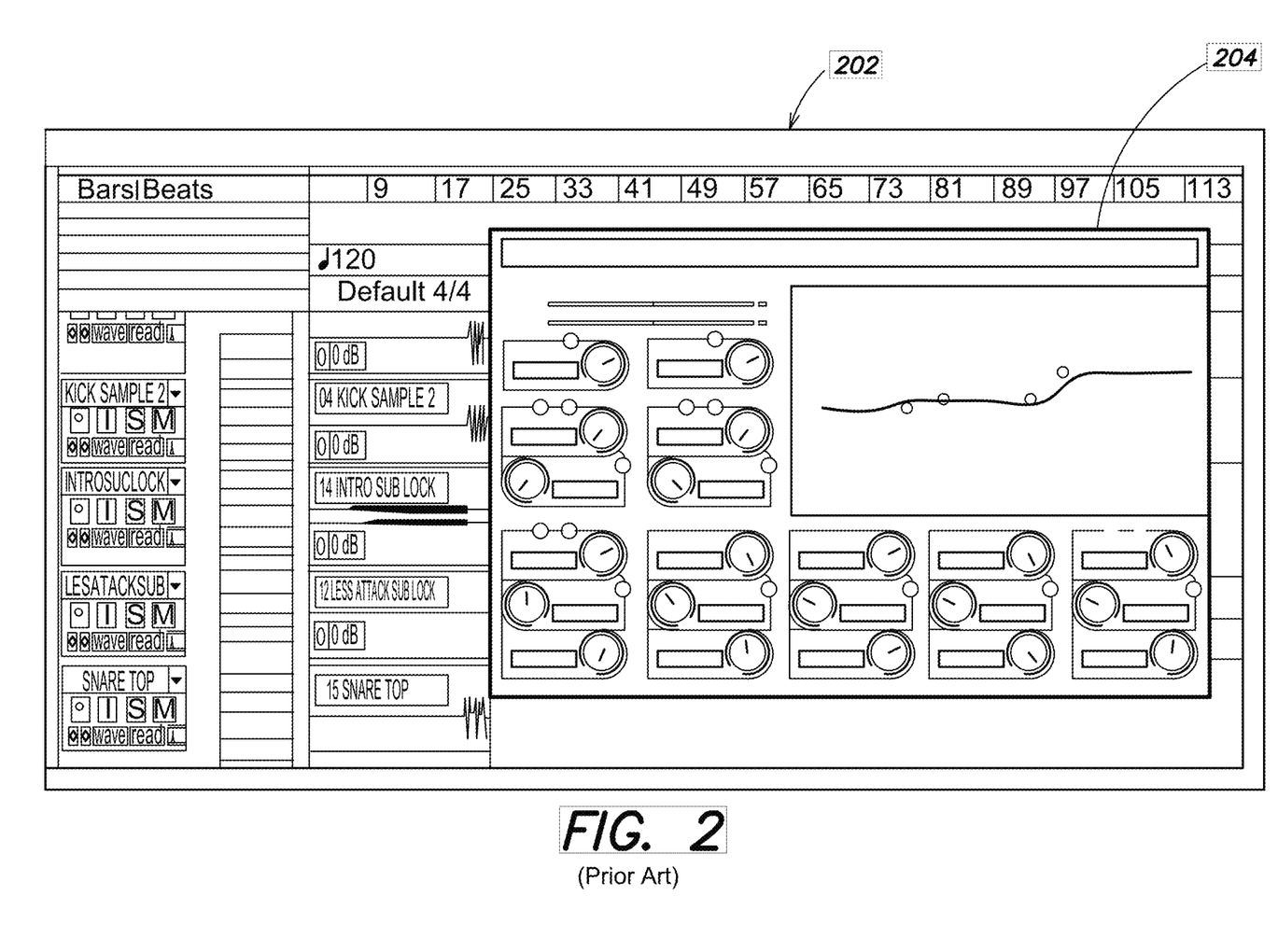
FIG. 2 is a diagrammatic representation of a portion of a user interface of a prior art digital audio workstation application with a separate window containing a plug-in user interface.

The user typically interacts with such plug-in software through a dedicated window or pane which displays a graphical user interface (GUI). The plug-in GUI presents data from the plug-in and provides control over the plug-in's parameters and other state. This GUI display may be embedded into a window already provided by the host software and it may be populated with graphical elements provided by the plug-in, pre-built graphical elements from the host, or a combination of the two. FIG. 2 shows an example of DAW GUI 202 with a plug-in presentation contained in separate window 204. Thus, in such a plug-in-augmented media editing application, the plug-in's GUI is presented as its own interactive entity, which is separated, both conceptually and spatially on the display, from the media data being processed.

A DAW may also present data which is derived from the plug-in within the context of the track display. For example, pitch information derived from a plug-in may be drawn by a DAW as lines representing pitch information for the audio data contained on a track, as shown in diagrammatic screenshot 300 illustrated in FIG. 3. In this example, horizontal lines representing the pitches and durations of individual notes in top region 302 of user interface window 300 are controlled by the host software while bottom part 304 of the window is controlled by the plug-in. A DAW may also draw its own representation of the plug-in's controls over the track data in region 302. In such cases, region 302 remains fully under the control of the DAW and is implemented as part of the DAW software. Furthermore, the host software presents the data in one form, with one set of tools for manipulating its document data, while the plug-in presents the data in another form, with another set of tools for manipulating or viewing its data with the result that the user's interactions with the plug-in are separated from their interactions with the host and with the media document.

Figure 3:
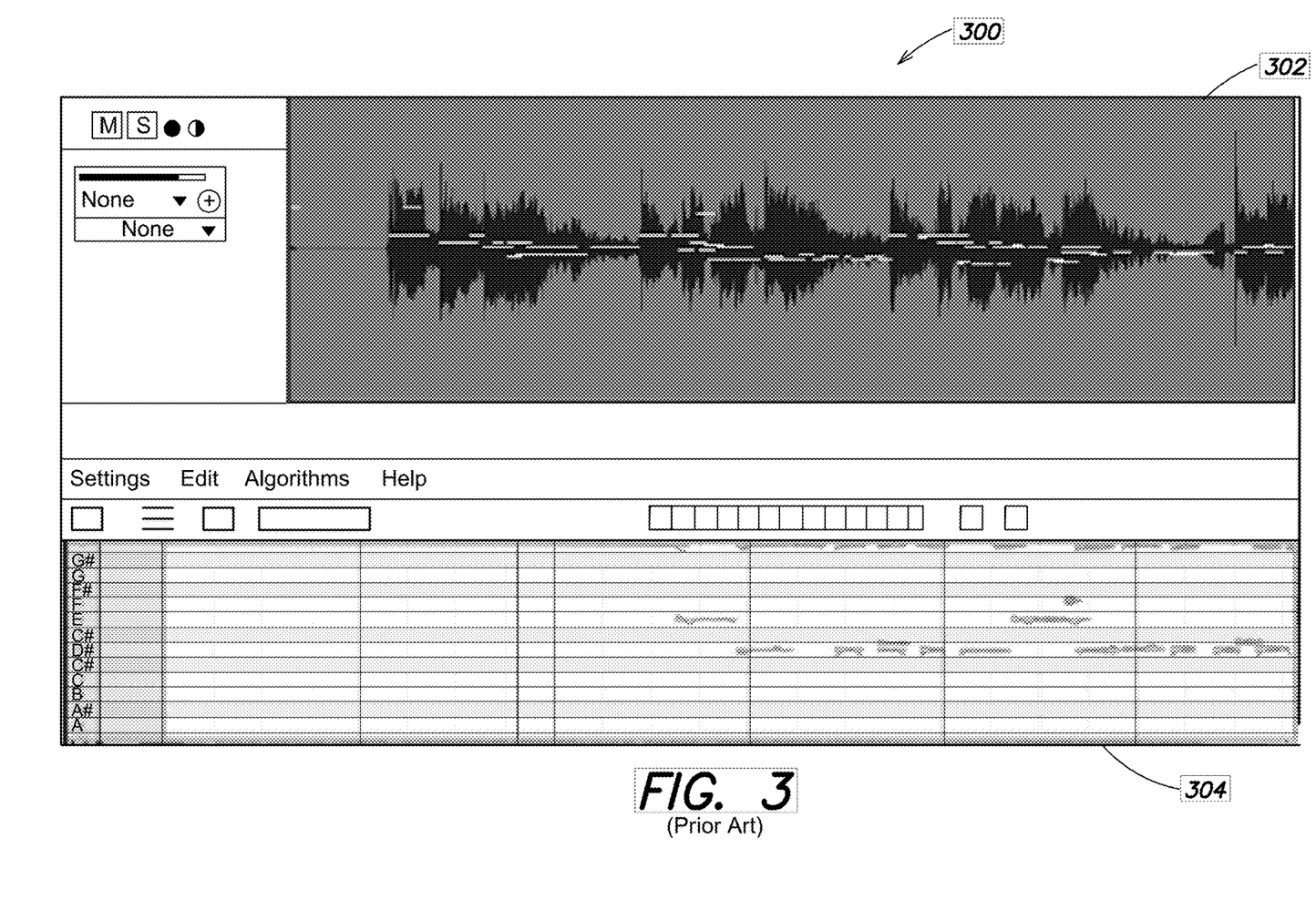

While this user interface separation may adequately support the use of some traditional audio processing plug-ins such as EQs and compressors, for many other kinds of plug-in this separation does not result in the most effective user workflow. In particular, some plug-ins present information involving a temporal range of data derived from the host document. For example, plug-in pane 304 displays pitch data associated with a temporal range of the host document's track media. Despite the fact that both the plug-in and host software are presenting information based on the same document data, the respective presentations present the data with different temporal scales and temporal ranges. Furthermore, user interactions with the respective representations of the document data require the use of different user interaction functions such as different editing tools and key commands. Users cannot view or operate on the data presented by the plug-in in the same way and in the same space as they can view or operate on the data presentations which are integrated into the host software's track view.

Thus, current editing workflows involving the use of plug-ins require the user to switch frequently between different spatial regions of a user interface, different data representations, different data manipulation tools, and different temporal scales. There is therefore a need to improve the experience of a user who is editing a media composition with a host media editing application in conjunction with one or more plug-in software modules.

SUMMARY

In general, plug-ins are able to generate and display custom representations of a media composition directly within one or more portions of the interface of a host editing application user interface. In various implementations, a host-generated timeline representation of media data of a media composition is replaced, augmented, or overlaid by the custom representation generated by a plug-in.

In general, in one aspect, a method of displaying media data of a media composition comprises: providing a host application for editing the media composition, wherein the host application generates a graphical user interface that includes a representation of the media composition, the representation including a portion displaying a timeline representation of a time-based element of the media composition; and providing a plug-in software module that interfaces with the host application, wherein the plug-in, when executing in conjunction with the host application: generates a custom representation of media data of the time-based element of the media composition; and displays the custom representation of the media data of the time-based element of the media composition within the portion of the graphical user interface generated by the host application representing the time-based element.

Various embodiments include one or more of the following features. Enabling an operator to perform an edit operation on the media composition based on the custom representation of the time-based element of the media composition. The edit operation uses editing functionality provided by the plug-in. The edit operation is performed by interacting with the custom representation of the time-based element. The edit operation includes selecting a portion of the media data represented by the custom representation. The edit operation is applied to media data that appears as a distinct feature within the custom representation. The custom representation assists the operator to focus on a portion of the time-based element upon which the edit operation is to be performed. The edit operation includes selecting an editing tool provided by the plug-in from a tool palette displayed within a region of the host application user interface associated with the timeline representation of the time-based element of the media composition. The edit operation is performed with a standard editing tool of the host application. The edit operation is performed using an editing tool of the host application whose function is modified by the plug-in. The custom representation of the time-based element of the media composition is a spectrogram representation and the edit operation includes altering audio of the time-based media element by selecting a portion of the time-based element in the spectrogram representation. The time-based element is an audio clip, and the edit operation includes altering pitch content within the audio clip. The custom representation augments a display generated by the host application within the portion of the graphical user interface displaying a timeline representation of a time-based element of the media composition. The custom representation replaces a display generated by the host application within the portion of the graphical user interface displaying a timeline representation of a time-based element of the media composition. The time-based element of the media composition is a media track or a media clip. The plug-in further generates and displays material within a portion of the graphical user interface generated by the host application external to and associated with the timeline representation of a time-based element of the media composition. The custom representation of the time-based element of the media composition is a spectrogram representation. The time-based element is an audio clip, and the custom representation includes the display of temporally aligned text derived from the audio clip. The time-based element is an audio clip, and the custom representation includes a representation of pitch content of the media data. The host application is one of a digital audio workstation application, a non-linear video editing application, and a music notation application.

In general, in another aspect, a computer program product comprises: a non-transitory computer-readable medium with computer-readable instructions encoded thereon, wherein the computer-readable instructions, when processed by a processing device instruct the processing device to perform a method of displaying media data of a media composition, the method comprising: providing a host application for editing the media composition, wherein the host application generates a graphical user interface that includes a representation of the media composition, the representation including a portion displaying a timeline representation of a time-based element of the media composition; and providing a plug-in software module that interfaces with the host application, wherein the plug-in, when executing in conjunction with the host application: generates a custom representation of media data of the time-based element of the media composition; and displays the custom representation of the media data of the time-based element of the media composition within the portion of the graphical user interface generated by the host application representing the time-based element.

In general, in a further aspect, a computer program product comprises: a memory for storing computer-readable instructions; and a processor connected to the memory, wherein the processor, when executing the computer-readable instructions, causes the system to perform a method of displaying media data of a media composition, the method comprising: providing a host application for editing the media composition, wherein the host application generates a graphical user interface that includes a representation of the media composition, the representation including a portion displaying a timeline representation of a time-based element of the media composition; and providing a plug-in software module that interfaces with the host application, wherein the plug-in, when executing in conjunction with the host application: generates a custom representation of media data of the time-based element of the media composition; and displays the custom representation of the media data of the time-based element of the media composition within the portion of the graphical user interface generated by the host application representing the time-based element.

BRIEF DESCRIPTION OF THE DRAWINGS

FIG. 3 is a diagrammatic representation of a portion of a user interface of a prior art digital audio workstation application in which the top portion is controlled by the digital audio workstation and the bottom part is controlled by a plug-in.

DETAILED DESCRIPTION

There is a large ecosystem of plug-in software modules that operate in conjunction with a host media processing application to add functionality to the host. As described above, the user interfaces, data representations, and manipulation tools of plug-ins have been kept conceptually and spatially separate from those of the host application.

We describe herein methods of integrating the user interfaces of the host and of a plug-in by allowing the host software to embed the plug-in's GUI directly into its track, clip, or other element or document data structure presentation, either as a complete replacement of the host's presentation of the data or as an overlay which decorates the existing host presentation. The examples presented herein are based on a DAW as the host, but the methods also apply to any media processing application, including non-linear video editing applications and music notation applications. As used herein, media processing application, media editing application, and media composition application are synonymous and used interchangeably. An example of a DAW is Pro Tools®, a product of Avid® Technology, Inc., of Burlington, Massachusetts. An example of a non-linear video editing application is Media Composer®, also a product of Avid Technology, Inc. An example of a music notation application is Sibelius®, also a product of Avid Technology, Inc. As used herein, the term "document" refers to what is being edited, and may refer to a media composition that includes one or more of audio, video, text, and metadata, or to a musical score.

When using this technique, the plug-in logic has control over the same display regions as those which are used by the host software to present details about the document. This allows the plug-in to provide a useful customized representation of the document data, either replacing or augmenting the existing presentation from the host software.

In addition to presenting a view of the document data which is appropriate to the processing being applied or to the analysis which has been requested, standard host tools with their normal functions may be used on a track which includes graphical elements presented by a plug-in. For example, editing operations such as object selection, cuts, and transitions may be performed on a representation of track data within the timeline supplied by a plug-in.

To further facilitate control over the document being edited, the embedding of a plug-in user interface may allow the plug-in to customize the effects of the host tools. For example, in a host that supports a crossfade tool for normal document editing, a plug-in may provide its own custom transitional effect when this crossfade tool is applied to media or track data which is being presented by the plug-in.

Plug-ins may also provide their own custom tools that have no analog in the host. Access to and selection of these tools may be embedded within a region or menu controlled by the host application, into a region controlled by the plug-in, or both. These custom tools may be associated with one or more specific tracks or with the overall document.

Embedding of a plug-in user interface within that of a host media processing application may require creation or extension of a plug-in API with a suitable interface for an embedded GUI. In addition to standard GUI API considerations such as the providing the plug-in with utilities for drawing into the appropriate regions, the interface may include additional features such as a means of identifying the portion of the document data which is currently displayed, randomly accessing the underlying document data, and communicating normal host document editing commands. To this end, when augmenting a timeline view with a plug-in presentation, the interface between the host and the plug-in requires at a minimum: drawing utilities; information about track media; and information about the currently visible timeline region. Other information that may be used by the interface includes: information about track objects; information about the current host timeline selection; play/stop bounds and other global timeline features; and requests for changes to the host data model.

Figure 4:
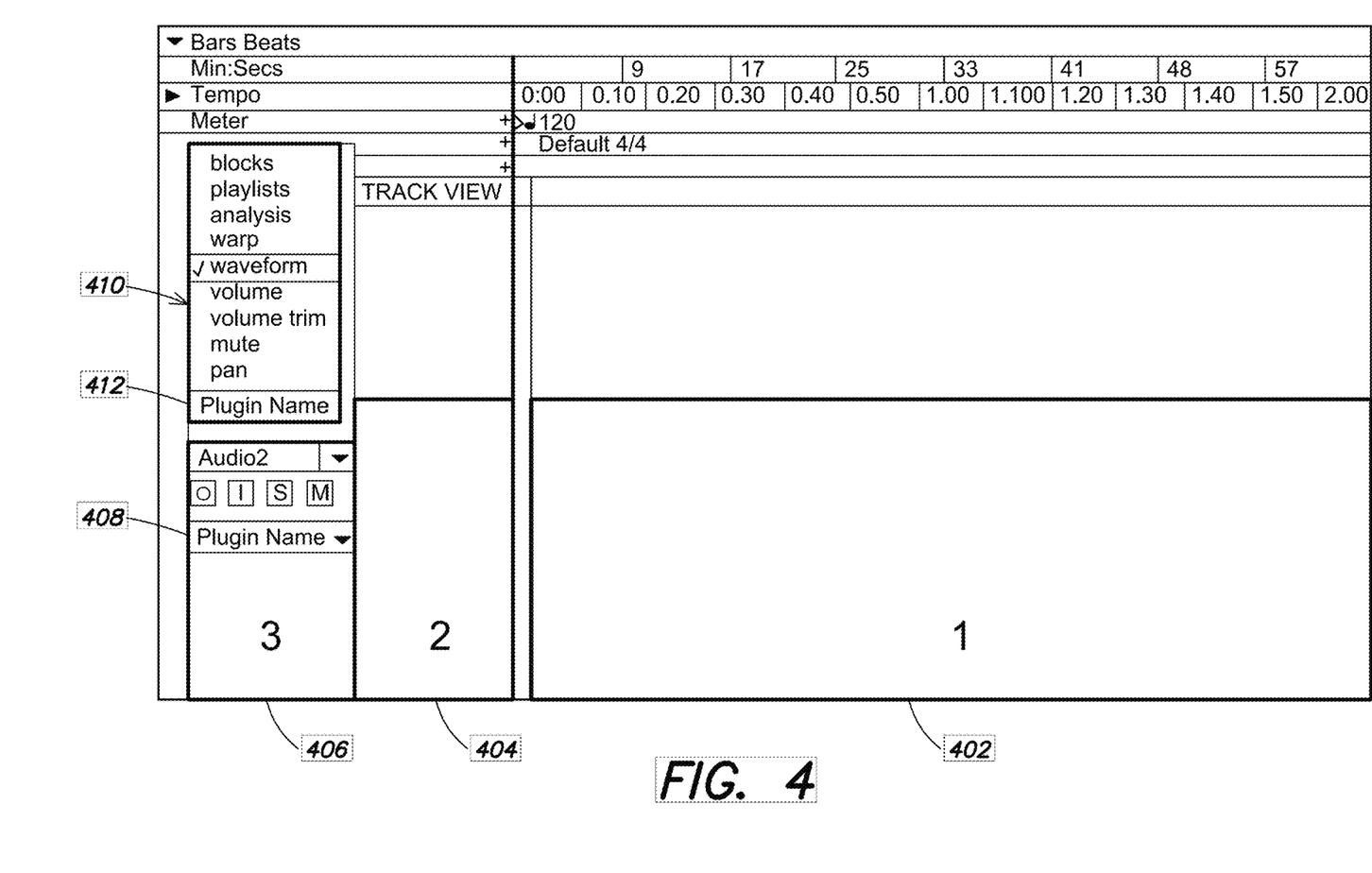
FIG. 4 is a diagrammatic representation of a user interface of a digital audio workstation showing exemplary regions associated with a timeline where portions of a plug-in's user interface may be integrated within that of the host DAW.

FIG. 4 shows a user interface of a DAW showing exemplary regions associated with a timeline where portions of a plug-in's user interface may be integrated within that of the host DAW. Region 1 402 is the area in which a representation of a track's audio data is shown on a timeline. The embedding within the timeline provides an in-context view of the track data that is appropriate to the processing which will be applied by the plug-in or to the analysis by the plug-in which has been requested. Such an in-context view involves the matching of the temporal scale and temporal range within the document shown by the host with that shown by the plug-in. Such temporal synchronization is not present when using traditional plug-ins with host applications, such as those whose user interface is confined to a discrete window superimposed on or adjacent to the host user interface.

A plug-in with an embedded interface may also draw into region 2 404. A presentation in this region remains fixed for the track and represents data or tools which apply to the whole track or to a particular region within the track, such as to the current timeline selection. This contrasts with the presentation in region 1, which reflects the media on the track at the respective location in time which is indicated by screen and document scrolling position. One use of this region is to present an overall analysis for the entire track, such as an overall peak loudness measurement. Another use of this region is to present a custom tool palette offering the operator custom editing tools that affect the operator's interactions with the track's timeline data elements. For example, an "enhance pen" tool may be used to draw in regions on the timeline where a vocal articulation enhancement effect is to be applied. The identification of the regions for the enhancement effect may be facilitated by an appropriate custom presentation of the audio data within the track in region 1, for example of a spectrogram presentation.

In another example, the plug-in may draw into a new region that is associated with tools to edit the document as a whole, such as the region visible along the top of FIG. 1. This indicates to the operator that the selected tool may be used for actions taken on any track.

Region 3 406 illustrates extension of host menus in order to provide the ability to "assign" a plug-in to a particular track and indicates the plug-in that is currently selected for this track, i.e., "Plugin Name" 408. Equivalent region 3 410 for the track displayed above the Audio 2 track in FIG. 4 shows an expanded menu with the plug-in ("Plugin Name" 412) added to the standard host-provided track view options as a choice for assignment. The custom presentation modes and their names are provided by the plug-in and inserted by the plug-ins into the corresponding extensible list of available presentation modes.

While plug-ins may utilize regions 1, 2, and 3 traditionally controlled exclusively by the host application, these regions continue to be available to the host application for the display of host-generated data or commands. For example, in region 1, the host may overlay a clip name onto a plug-in generated custom view of clip data.

Figure 5:
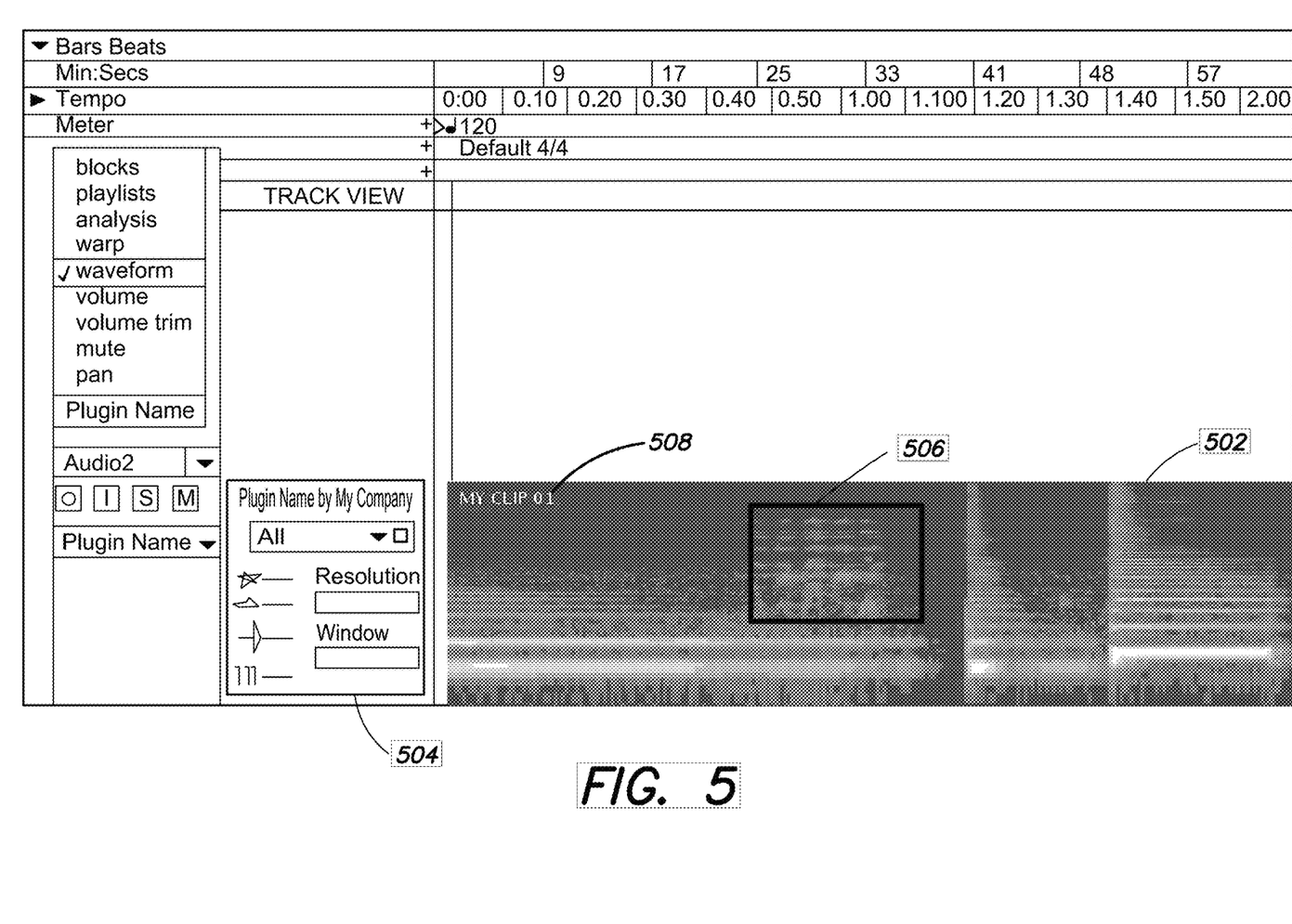
FIG. 5 illustrates an audio repair plug-in embedded within a digital audio workstation application user interface.

FIG. 5 illustrates a plug-in embedded in a DAW user interface that utilizes regions 1, 2, and 3 of FIG. 4. The specific plug-in shown is an example of a plug-in used for altering the audio data, in this case for performing audio repair operations. In region 1, the in-track representation 502 of the data within the DAW timeline is generated by the plug-in. This is accomplished via an API which provides the plug-in with utilities for drawing into the appropriate regions as well as access to a variety of data about the track. At minimum, the position and contents of track media must be provided by the host. Additional features of the API may include facilities to apply changes to the media data or to data derived from the media data, and facilities to provide additional data to the plug-in. Such additional data provided to the plug-in may include: facilities to apply changes to the media data; data about the currently visible timeline region; track object information such as media clip names and boundaries; timeline information such as selection boundaries, cursor position, timeline markers, tempo changes, and play/stop points; and track data such as name, type, and display color. Here, the in-track presentation represents the audio data as a detailed spectrogram display with the vertical position within the timeline indicating frequency, and the brightness and hue representing intensity at that frequency for each vertical time slice. With the representation of the data appropriate to the audio repair function appearing within the DAW track itself, the operator is able to focus on the task directly within the context of the DAW track. Accompanying the spectrogram display, the plug-in provides custom tool palette 504, which may be displayed adjacent to the track's timeline data presentation. This allows the operator to select a tool and make specific edits and repairs to the audio by viewing and interacting with the audio data directly within the track without the need for the operator to shift attention to a separate plug-in window or pane. For example, the operator may examine the spectrogram display to identify an anomalous region in the audio data, use a frequency-time-axis two-dimensional selection tool to specify the unwanted frequencies in this region, then use a selection-based effect to suppress the energy in the selected frequencies at the desired points in time. The region thus defined is then corrected by the audio repair plug-in. For example, track 502 shows three notes played on a guitar with some unwanted string squeaking sounds visible as a series of anomalous high-frequency energy in the upper half of the in-track spectrogram view between time offsets of about 0:45 to 1:05. Using custom tool palette 504, the operator selects a rectangular selection tool and positions it over the anomalous region to specify the region to be repaired by the audio repair plug-in, as indicated by rectangle 506. Clip name 508, provided by the host, is overlaid onto the custom spectrogram view. When the repair is complete, an operator may change the track view back to a more basic view of the audio data, such as a waveform view. Alternatively, rather than revert back to a host-generated view of the audio data after a plug-in mediated function is performed, a plug-in generated custom view may be retained as a layer under or over the host-generated view. For example, the standard waveform view generated by the host may be layered on top of the spectrogram view of FIG. 5, 502.

Other audio-specific examples of a custom representation of document data presented by a plug-in within the host's representation include a customized waveform view, a view of audio data displayed as pitch data, a customized spectrogram display of audio data, an overlay highlighting regions of excessive loudness, a display of spatial positioning for a multi-channel audio track, a text overlay labeling each clip with certain metadata, an overlay indicating possible audio artifacts, and an overlay for dialog showing a transcript derived from the audio. Each of these custom representations may be accompanied by a corresponding palette of custom editing tools for editing or analyzing audio data directly within the context of the audio document. In general, a custom representation enhances the presentation of features of the media data in a way that is useful to the operator. For example, the custom representation may: enhance the presentation of features of the media data which are useful to an operator for evaluating the effect of the data on the composition; highlight one or more portions of a time-based element that should be brought to the operator's attention; or present the media data in terms of features over which the plug-in provides some unique aspect of editing control. As a specific example, a plug-that shows audio data as notes on a score enhances the presentation of pitch features of the media data in a way that is useful for evaluation of the data's pitch content. If this plug-in also provides audio editing functions such as grabbing and dragging note objects to different pitch values, then the presentation of the data is being made in terms of pitch features over which the plug-in provides a unique form of control.

Figure 6:
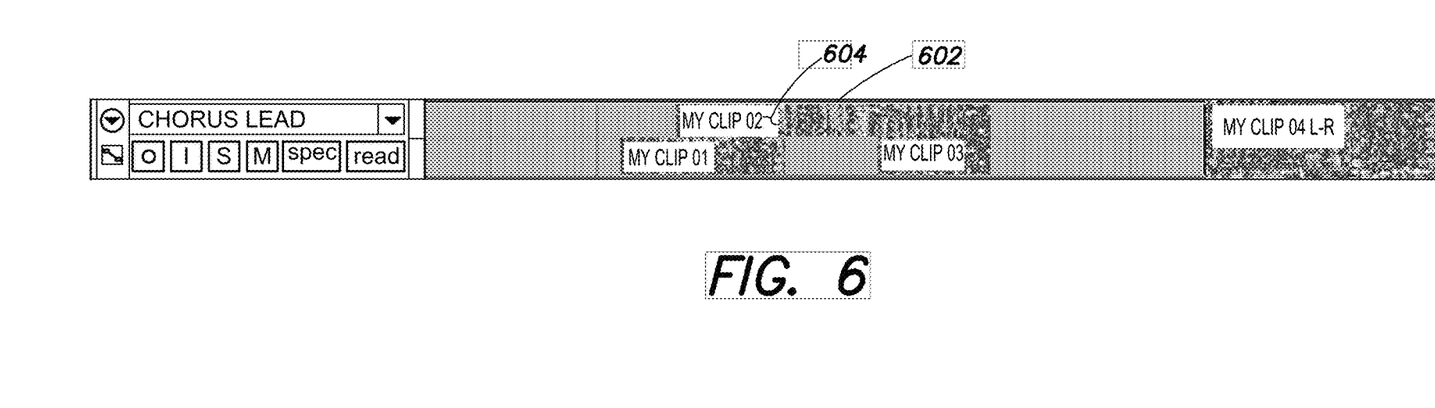
FIG. 6 illustrates a customized plug-in-generated spectrogram display of audio data within a timeline representation of a track of a media composition with together with clip names provided by the host digital audio workstation application.
Figure 7:
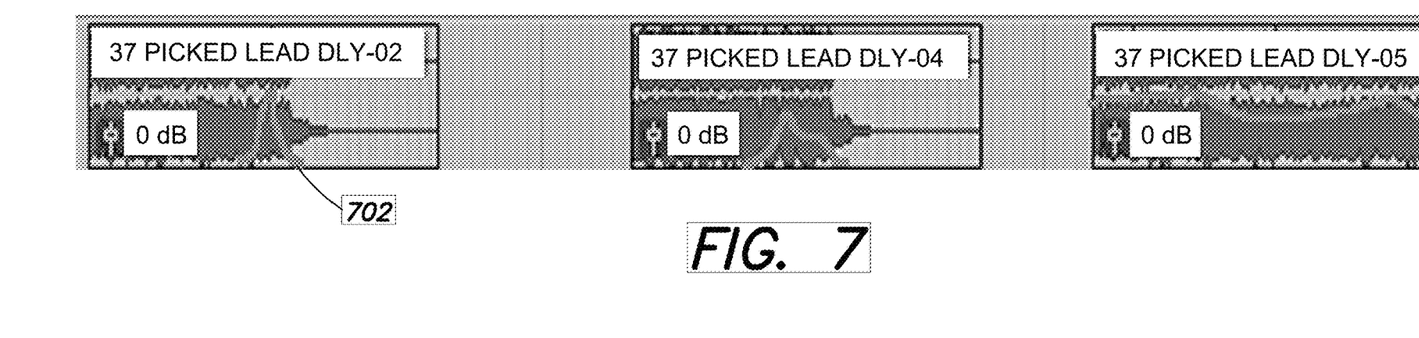
FIG. 7 illustrates an embedded plug-in-generated overlay highlighting regions of excessive loudness over a host-generated waveform representation of media data.
Figure 8:
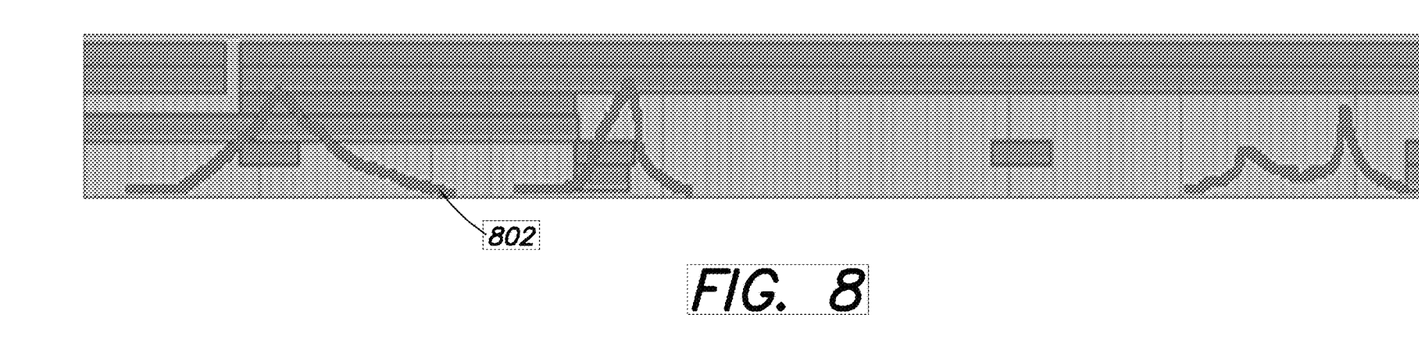
FIG. 8 illustrates an embedded plug-in-generated overlay highlighting regions of excessive loudness over a host-generated multi-track timeline.
Figure 9:
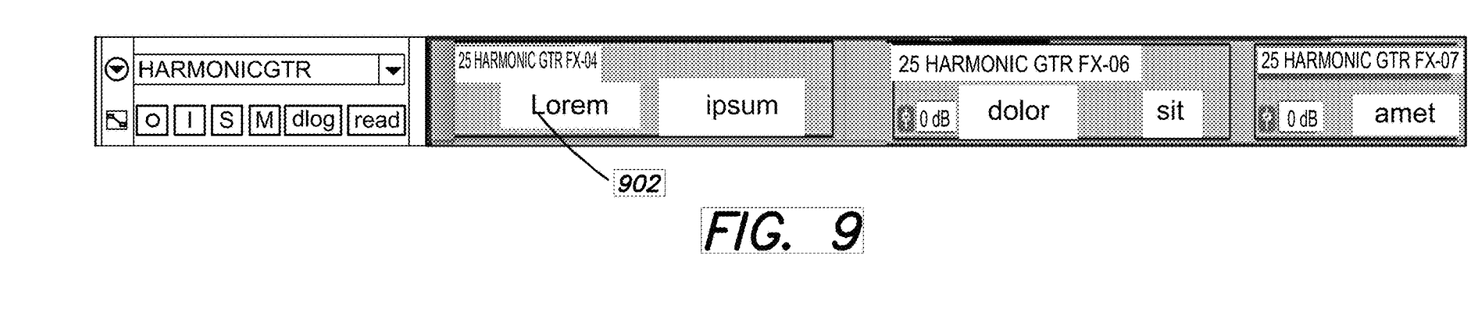
FIG. 9 illustrates an embedded plug-in-generated overlay showing transcript text derived from an audio speech track.

FIG. 6 illustrates customized plug-in-generated spectrogram display 602 of the audio data within a track with host-provided clip names such as clip name 604 overlaid onto the spectrogram. In this example the plug-in performs an analysis of the audio and generates the spectrogram representation, which may be useful for analyzing certain kinds of audio data, particularly vocalizations or mixtures of audio signals with different characteristics, such as a recording of a musical instrument playing in a noisy environment. As described above in connection with FIG. 5, such a visualization may be provided by a plug-in that provides a spectral repair tool. In FIGS. 7 and 8 embedded plug-in-generated overlays 702 and 802 respectively highlight regions of excessive loudness. The identification of such "hot spots" within the context of the whole composition may be much more useful to an operator than when such data is presented in a graphical region which is separated from the region used to present the composition. In FIG. 9, an embedded plug-in-generated overlay shows transcript text 902 derived from the corresponding audio speech track.

Another example of the described embedded plug-in presentation is an analysis plug-in that draws the operator's attention to abrupt clip transitions. The plug-in indicates points directly on the host's presentation of the timeline and the user executes a normal host operation, such as inserting a fade, onto a track which is showing the plug-in presentation of the track data.

Figure 10:
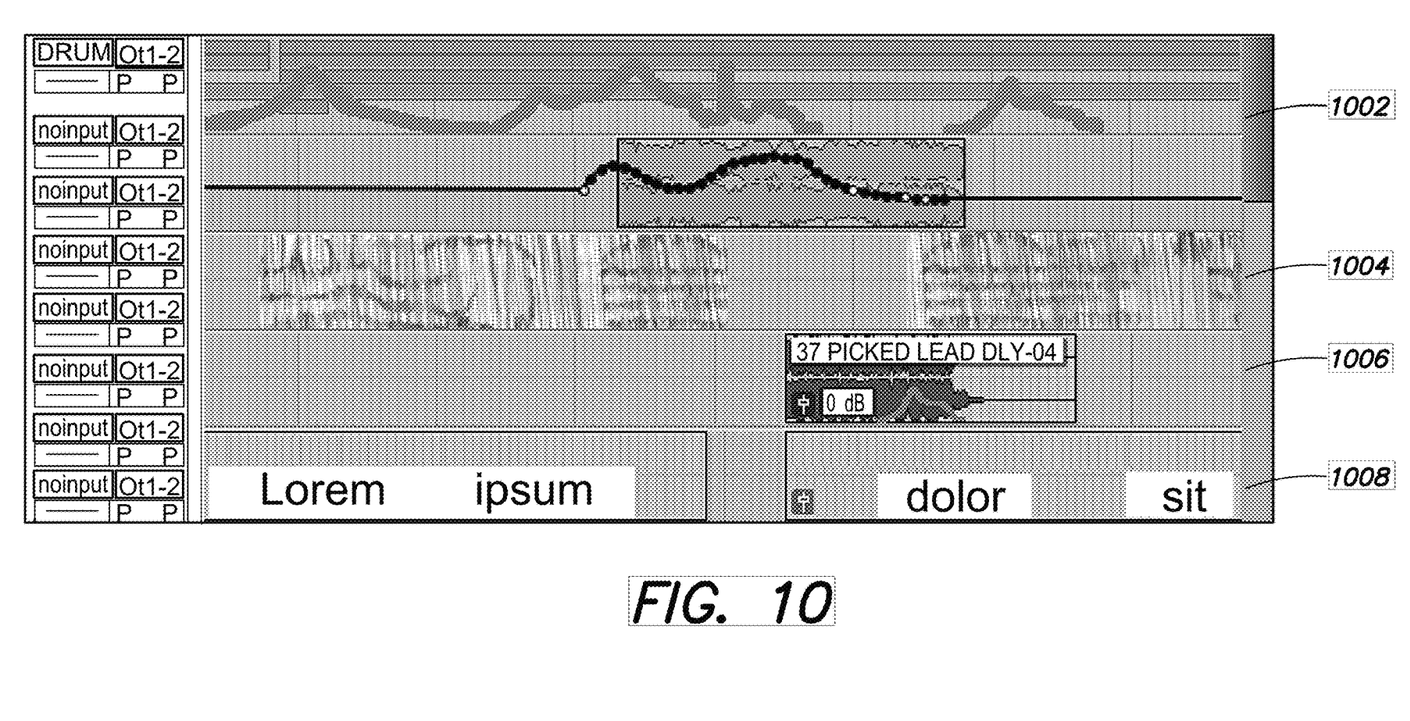
FIG. 10 illustrates a multi-representational timeline in which different customized representations generated by plug-ins are displayed in each of four different tracks.

A different plug-in-generated customization may be used for each of several different tracks or lanes within the host software depending on the data contained in these tracks and on the operator's current requirements for reviewing, comparing, or editing this data. FIG. 10 illustrates such a multi-representational timeline with each of four tracks 1002, 1004, 1006, and 1008. In this example, an operator is able to simultaneously review an audio-to-text display of spoken dialog in track 1008 while performing loudness correction on background music tracks 1002 and 1006 and spectral analysis on sound effect track 1004. The task may be performed entirely within the context of the audio document without the need to shift the operator's focus to one or more separate plug-in user interface windows or panes.

In a further integration of a plug-in user interface with that of the host application, document editing tool actions from the host application can be applied in the context of the embedded plug-in display. For example, a "grabber" tool which is normally used to select and move metadata objects such as volume automation handles in the timeline may instead, when applied within the custom track view of a pitch correction plug-in, be used to change the pitch of an audio object displayed within this view. In another example a "scissors" tool which would normally be used to separate a single clip into two clips may be manipulated by an effect plug-in to apply a specially processed transition effect between the separated clips.

As indicated above, the described methods enable a plug-in presentation to be layered over the existing host presentation or vice-versa. The overlay may be applied more than once in order to layer the information from multiple plug-ins onto a single track presentation. For example, an audio-to-text presentation may be layered over a spectrogram presentation from an audio correction plug-in to provide a useful reference when performing audio corrections on the underlying data. In this case the operator may use a tool palette provided by the audio correction plug-in to make edits to the track, such as a "lasso" tool to select and correct a particular burst of high energy in a certain frequency range at a particular point on the timeline, while simultaneously referencing the corresponding dialog in the track overlay from the audio-to-text presentation plug-in.

The methods described herein may be used to integrate plug-in presentations with a host non-linear video editing application. For example, a plug-in that analyzes a video clip or track for illegal colors, such as those that lie outside the gamut of a particular color representation, may highlight regions containing illegal colors directly onto the host timeline representation. The highlighting may be in the form of icons overlaid by the plug-in onto the timeline, e.g., a green check mark for legal regions, a yellow triangle to warn that colors are nearing the edge of the legal range, and a red stop sign indicating colors that have exceeded the legal limits. Other highlighting methods the plug-in may use include applying shading to a waveform displayed in the timeline or drawing lines spanning temporal ranges within the timeline corresponding to the illegal portions. Similarly, a plug-in that analyzes an audio track for regions having excessively high volume levels that may result in audio clipping is able to highlight such regions directly within the timeline.

The methods described herein may also be used with a music notation application as the host application. In a manner analogous to that described above in connection with digital audio workstations, a plug-in may embed a custom representation, a graphical element such as an icon, or other material directly into a region of the notation application used for displaying a musical score. A common type of plug-in for music notation applications is one that is invoked to generate the sound of a musical instrument during playback of a MIDI file corresponding to the score. Such plug-ins may have their own custom controls, such as for volume and expression, which may be overlaid on to the score to show the relationship between the actions of the plug-in and the source score material. For example, if an effect is to be applied to a specific portion of the score, the plug-in may expose its state and controls directly within the score in association with the specific portion. Interfaces for custom plug-in generated controls may be integrated with or replace those generated by the host within other regions of the host interface as well. Such regions include but are not limited to a mixer window where the plugin may provide additional mixing controls and signal level indicators for the audio channels they control, an inspector window, and an ideas window.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of displaying media data of a media composition, the method comprising:
providing a host application for editing the media composition, wherein the host application generates a graphical user interface that includes a representation of the media composition, the representation including a portion displaying a timeline representation of a time-based element of the media composition, the time-based element of the media composition being associated with media data;
providing a plug-in software module, wherein an interface between the plug-in software module and the host application uses drawing utilities that enable the plug-in software module to directly display graphical information within the graphical user interface generated by the host application, wherein the plug-in software module is configured to:
generate a custom representation of the media data associated with the time-based element of the media composition; and
use the drawing utilities to directly display the custom representation of the media data associated with the time-based element of the media composition within the portion of the graphical user interface displaying the timeline representation of the time-based element of the media composition and in temporal synchrony with the timeline representation of the time-based element, and
enabling an operator to perform an edit operation on the media composition based on the custom representation of the media data associated with the time-based element of the media composition, wherein the edit operation includes selecting an editing tool provided by the plug-in software module from a tool palette displayed within a region of the graphical user interface generated by the host application.

2. The method of claim 1, further comprising enabling an operator to use the custom representation to perform an edit operation that uses editing functionality provided by the plug-in software module.

3. The method of claim 1, further comprising enabling an operator to use the custom representation to perform an edit operation by interacting with the custom representation of the media data associated with the time-based element.

4. The method of claim 1, wherein the edit operation includes selecting a portion of the media data represented by the custom representation.

5. The method of claim 1, further comprising enabling an operator to use the custom representation to perform an edit operation that is applied to media data that appears as a distinct feature within the custom representation.

6. The method of claim 1, wherein the custom representation assists the operator to focus on a portion of the time-based element upon which an edit operation is to be performed.

7. The method of claim 1, further comprising enabling an operator to use the custom representation to perform an edit operation that includes selecting an editing tool provided by the plug-in from a tool palette displayed within a region of the graphical user interface generated by host application that is external to the timeline representation of the time-based element of the media composition.

8. The method of claim 1, further comprising enabling an operator to use the custom representation to perform an edit operation that is performed with a standard editing tool of the host application.

9. The method of claim 1, further comprising enabling an operator to use the custom representation to perform an edit operation that is performed using an editing tool of the host application whose function is modified by the plug-in software module.

10. The method of claim 1, wherein the custom representation of the media data associated with the time-based element of the media composition is a spectrogram representation, further comprising enabling an operator to use the custom representation to perform an edit operation that includes altering audio of the media data associated with the time-based element by selecting a portion of the time-based element in the spectrogram representation.

11. The method of claim 1, wherein the time-based element is an audio clip, further comprising enabling an operator to use the custom representation to perform an edit operation that includes altering pitch content within the audio clip.

12. The method of claim 1, wherein the custom representation augments a display generated by the host application within the portion of the graphical user interface displaying the timeline representation of the time-based element of the media composition.

13. The method of claim 1, wherein the custom representation replaces a display generated by the host application within the portion of the graphical user interface displaying the timeline representation of the time-based element of the media composition.

14. The method of claim 1, wherein the time-based element of the media composition is a media track.

15. The method of claim 1, wherein the time-based element of the media composition is a media clip.

16. The method of claim 1, wherein the plug-in software module further generates and displays material within a portion of the graphical user interface generated by the host application external to and associated with the timeline representation of the time-based element of the media composition.

17. The method of claim 1, wherein the custom representation of the time-based element of the media composition is a spectrogram representation.

18. The method of claim 1, wherein the time-based element is one of an audio clip and an audio track, and the custom representation includes the display of temporally aligned text derived from the one of the audio clip and the audio track.

19. The method of claim 1, wherein the time-based element is one of an audio clip and an audio track, and the custom representation includes a representation of pitch content of the one of the audio clip and the audio track.

20. The method of claim 1, wherein the host application is a digital audio workstation application and the time-based element is one of an audio clip and an audio track.

21. The method of claim 1, wherein the host application is a non-linear video editing application and the time-based element is one of a video clip and a video track.

22. The method of claim 1, wherein the host application is a music notation application, and the timeline representation is a musical score of the media composition.

23. A computer program product comprising:
a non-transitory computer-readable medium with computer-readable instructions encoded thereon, wherein the computer-readable instructions, when processed by a processing device instruct the processing device to perform a method of displaying media data of a media composition, the method comprising:
providing a host application for editing the media composition, wherein the host application generates a graphical user interface that includes a representation of the media composition, the representation including a portion displaying a timeline representation of a time-based element of the media composition, the time-based element of the media composition being associated with media data;
providing a plug-in software module, wherein an interface between the plug-in software module and the host application uses drawing utilities that enable the plug-in software module to directly display graphical information within the graphical user interface generated by the host application, wherein the plug-in software module is configured to:
generate a custom representation of the media data associated with the time-based element of the media composition; and
use the drawing utilities to directly display the custom representation of the media data associated with the time-based element of the media composition within the portion of the graphical user interface displaying the timeline representation of the time-based element of the media composition and in temporal synchrony with the timeline representation of the time-based element, and
enabling an operator to perform an edit operation on the media composition based on the custom representation of the media data associated with the time-based element of the media composition, wherein the edit operation includes selecting an editing tool provided by the plug-in software module from a tool palette displayed within a region of the graphical user interface generated by the host application.

24. A system comprising:
a memory for storing computer-readable instructions; and
a processor connected to the memory, wherein the processor, when executing the computer-readable instructions, causes the system to perform a method of displaying media data of a media composition, the method comprising:
providing a host application for editing the media composition, wherein the host application generates a graphical user interface that includes a representation of the media composition, the representation including a portion displaying a timeline representation of a time-based element of the media composition, the time-based element of the media composition being associated with media data;
providing a plug-in software module, wherein an interface between the plug-in software module and the host application uses drawing utilities that enable the plug-in software module to directly display graphical information within the graphical user interface generated by the host application, wherein the plug-in software module is configured to:
generate a custom representation of the media data associated with the time-based element of the media composition; and
use the drawing utilities to directly display the custom representation of the media data associated with the time-based element of the media composition within the portion of the graphical user interface displaying the timeline representation of the time-based of the media composition and in temporal synchrony with the timeline representation of the time-based element, and
enabling an operator to perform an edit operation on the media composition based on the custom representation of the media data associated with the time-based element of the media composition, wherein the edit operation includes selecting an editing tool provided by the plug-in software module from a tool palette displayed within a region of the graphical user interface generated by the host application.

* * * * *